United States Patent
Heikkila et al.

(10) Patent No.: US 8,921,541 B2
(45) Date of Patent: Dec. 30, 2014

(54) SEPARATION PROCESS

(75) Inventors: Heikki Heikkila, Espoo (FI); Hannu Koivikko, Kantvik (FI); Jari Lewandowski, Siuntio (FI); Mika Manttari, Lappeenranta (FI); Jari Mattila, Kirkkonummi (FI)

(73) Assignee: DuPont Nutritional Biosciences APS, Copenhagen K (DK)

( * ) Notice: Subject to any disclaimer, the term of this patent is extended or adjusted under 35 U.S.C. 154(b) by 881 days.

(21) Appl. No.: 12/303,069

(22) PCT Filed: May 29, 2007

(86) PCT No.: PCT/FI2007/050306
§ 371 (c)(1),
(2), (4) Date: Dec. 1, 2008

(87) PCT Pub. No.: WO2007/138167
PCT Pub. Date: Dec. 6, 2007

(65) Prior Publication Data
US 2009/0270609 A1 Oct. 29, 2009

(30) Foreign Application Priority Data
May 30, 2006 (FI) .................................... 20065363

(51) Int. Cl.
| | |
|---|---|
| C07H 1/06 | (2006.01) |
| C13B 35/08 | (2011.01) |
| B01D 61/02 | (2006.01) |
| C13B 20/16 | (2011.01) |

(52) U.S. Cl.
CPC ............. *C13B 35/08* (2013.01); *B01D 61/027* (2013.01); *C13B 20/165* (2013.01); *B01D 2315/14* (2013.01)
USPC ....................................................... 536/127

(58) Field of Classification Search
USPC ....................................................... 536/127
See application file for complete search history.

(56) References Cited

U.S. PATENT DOCUMENTS

| | | | |
|---|---|---|---|
| 5,965,028 A | 10/1999 | Verhoff et al. | |
| 6,773,512 B2 * | 8/2004 | Ennelin et al. | 127/46.2 |
| 6,872,316 B2 * | 3/2005 | Heikkila et al. | 210/652 |
| 2003/0092136 A1 | 5/2003 | Delobeau | |

FOREIGN PATENT DOCUMENTS

| | | | | |
|---|---|---|---|---|
| EP | 0452238 A2 * | 10/1991 | ............... | C31K 1/00 |
| WO | 01/14594 A2 | 3/2001 | | |
| WO | 02/053781 A1 | 7/2002 | | |
| WO | 02/053783 A1 | 7/2002 | | |
| WO | 2004/002938 A1 | 1/2004 | | |
| WO | 2004/003236 A1 | 1/2004 | | |
| WO | WO 2004/002938 A1 * | 1/2004 | ............ | C07C 227/40 |

OTHER PUBLICATIONS

Aydoğab, N. et al., "Effect of Operating Parameters on the Separation of Sugars by Nanofiltration", Separation Science and Technology, 33(12):1767-1785 (1998).
Bruening, M. L., et al., "Nanofiltration with Multilayer Polyelectrolyte Membranes", Polymeric Materials: Science & Engineering, 89:169 (2003).
Abstract of Chemistry and Industry of Forest Products, 22(1):77-81 (2002); abstract of SPRI 1996; abstract of Sugar Journal 58:29-31 (1995); abstract of "Process for preparing an alpha crystalline anhydrous dextrose of high priority" 01041161/EP-A1 (2000); abstract of Regiec, P., "Application of nanofiltration for condensing model sugar juices", Litsy Cukrovarmicke a Reparske 120:132-134 (2004); abstract of Theoleyre, M. A., "Process for purification by nanofiltration of an aqueous sugar solution containing monovalent and polyvalent anions and cations" Patent No. FR 2848877 A1.
Abstract of Gang, Y., et al., "Concentration of xylose solution through nanofiltration", Mo Kexue Yu Jishu, 20(5):21-26 (2000) and abstract of Fu-Guo, Yang, et al., "Applications of membrane separation technique in the preparation of xylo-oligosaccharides and ethanol fermentation", Linchan Huaxue Yu Gongye22(1):77-81 (2002).
Murthy, G.S., et al., "Concentration of xylose reaction liquor by nanofiltration for the production of xylotol sugar alcohol", Separation and Purification Technology, 44:221-225 (2005).
Saska, M. et al., "Direct Production of White Cane Sugar with Clarification and Decolorization Membranes Part I and Part II", Sugar Journal, (Nov. 19-21, 1995) and (Dec. 29-31, 1995).
International Search Report for International Application No. PCT/FR2007/050306 dated Sep. 26, 2007.

* cited by examiner

*Primary Examiner* — Ganapathy Krishnan
(74) *Attorney, Agent, or Firm* — Scully, Scott, Murphy & Presser, P.C.

(57) ABSTRACT

The invention relates to an improved nanofiltration process for separating and recovering components, such as sugars and sugar alcohols from multicomponent mixtures. The process of the invention is characterized by collecting the nanofiltration retentate/permeate in several fractions with different purity, optional recycling of at least one of the collected nanofiltration retentate/permeate fractions to the nanofiltration and recovering the desired component from the nanofiltration permeate/retentate fractions by different methods. In one embodiment of the invention, the process comprises a combination of nanofiltration and chromatography.

42 Claims, No Drawings

SEPARATION PROCESS

FIELD OF THE INVENTION

The present invention relates to an improved nanofiltration process of separating at least one component, such as a sugar component, for example xylose, fructose and maltose from multicomponent mixtures.

BACKGROUND OF THE INVENTION

Nanofiltration has been used for separating sugars, such as monosaccharides and disaccharides from each other and from other substances, such as higher saccharides. For example monosaccharides like glucose, fructose and xylose and disaccharides like sucrose have been separated and recovered by various nanofiltration processes. The starting mixtures including monosaccharides, disaccharides and higher saccharides may be of different origin, such as plant-based biomass hydrolysates or starch hydrolysates, for example.

U.S. Pat. No. 5,869,297, Archer Daniels Midland Co. (published Feb. 9, 1999) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Crosslinked aromatic polyamide membranes have been used as nanofiltration membranes. Furthermore, it is proposed that a portion of the nanofiltration retentate may be recycled to the nanofiltration feed tank.

WO 99/28490, Novo Nordisk AS (published Jun. 10, 1999) (=U.S. Pat. No. 6,329,182) discloses a method for enzymatic reaction of saccharides and for nanofiltration of the enzymatically treated saccharide solution including monosaccharides, disaccharides, trisaccharides and higher saccharides. Monosaccharides are obtained in the nanofiltration permeate, while an oligosaccharide syrup containing disaccharides and higher saccharides is obtained in the retentate. The retentate including the disaccharides and higher saccharides is recovered. A thin film composite polysulfone membrane having a cut-off size less than 100 g/mol has been used as the nanofiltration membrane, for example. It is recited that the permeate resulting from the nanofiltration may be recycled to the enzymatic reaction.

U.S. Pat. No. 4,511,654, UOP Inc. (published Apr. 16, 1985) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

U.S. Pat. No. 6,126,754, Roquette Freres (published Oct. 3, 2000) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content. Furthermore, it is proposed that at least part of the nanofiltration retentante may be subjected to saccharification to obtain a saccharified nanofiltration retentate. The saccharified nanofiltration retentate may be subjected to molecular sieving, for example by chromatographic separation or nanofiltration, to collect a fraction with a higher dextrose content and a fraction with a lower dextrose content. The dextrose-enriched fraction may then be mixed with the starch hydrolyzate having a high dextrose content obtained previously in the process.

U.S. Pat. No. 6,406,546 B1, Tate & Lyle Industries (published Jun. 18, 2002) discloses a process of obtaining sucrose from a sucrose-containing syrup by nanofiltering the syrup through a nanofiltration membrane and recovering the nanofiltration retentate enriched in sucrose. It is recited that invert sugars are passed through the nanofiltration membrane into the nanofiltration permeate. FIG. 3 of the publication discloses a three-stage nanofiltration process for obtaining a sucrose-containing nanofiltration retentate and nanofiltration permeate. The nanofiltration retentate including the desired product from the three-stage nanofiltration is collected in one fraction, i.e. the retentate from the preceding nanofiltration stage is introduced into the next nanofiltration stage, and the retentate from the last nanofiltration stage is collected. Also the nanofiltration permeate is collected in one fraction.

U.S. Pat. No. 6,406,547 B1, Tate & Lyle Industries (published Jun. 18, 2002) discloses a process for producing sugar (sucrose) from beets by a multistep process, which comprises two successive ultrafiltration steps and a nanofiltration step. The nanofiltration retentate thus obtained and having a high concentration of sucrose can be used in evaporation and crystallization operations to produce crystals of white sugar. The process can optionally include ion exchange and/or electrodialysis purification steps, prior to or after the nanofiltration step. It is also recited that recycle syryps, for example mother liquors from the crystallization can be treated with an enzyme or chromatographic separation to remove raffinose.

US 2003/0092136A1, D. Delobeau (published May 15, 2003) discloses a process for the manufacture of a starch hydrolysate having a high content of dextrose by a two-stage nanofiltration process. A nanofiltration permeate enriched in dextrose (glucose) is recovered. The nanofiltration retentates from both nanofiltration stages may be completely or partially recycled to the nanofiltration feed. The permeate containing the desired product from the two-stage nanofiltration is collected in one fraction, i.e. the permeate from the first nanofiltration stage is introduced into the second nanofiltration stage, and the permeate from the second nanofiltration stage is collected.

US 2002/0079268 A1, J-J Caboche (published Jun. 27, 2002) discloses a process for preparing a fermentation medium for producing high-purity metabolites (such as organic acids, for example optically pure L-lactic acid) from a renewable material (such as wheat solubles or corn steep liquor) by nanofiltration and/or electrodialysis. The purpose of the nanofiltration/electrodialysis is to eliminate low molecular weight impurities from the raw material.

U.S. Pat. No. 5,965,028, Reilly Industries (published Oct. 12, 1999) discloses a process for the separation of citric acid from less desirable components having a molecular weight similar to that of citric acid (such as glucose and/or fructose) by nanofiltration. A nanofiltration permeate enriched in citric acid is recovered. Citric acid is then crystallized from the nanofiltration permeate. A portion of the mother liquid from the crystallization may be recycled to upstream and/or downstream of the nanofiltration step, after a recovery step to recover citric acid. The feed used for the nanofiltration is typically a clarified citric acid fermentation broth.

M. Saska et al. discuss the decolorization of white cane sugar by nanofiltration in "Direct Production of White Cane Sugar with Clarification and Decolorization Membranes", Sugar Journal, November 1995, pp. 19 to 21 and December 1995, pp. 29 to 31. Decolorization of ultrafiltered clarified juice was carried out with G-10 thin-film nanofiltration membranes (Desalination Systems Inc., Escondido, Calif.) having a molecular weight cut-off of 2500 daltons.

N. Aydogan et al. (Department of Chemical Engineering, Middle East Technical University, Ankara, Turkey) discuss the separation and recovery of sugars by nanofiltration in "Effect of operating parameters on the separation of sugars by nanofiltration", Separation Science and Technology (1998), 33(12), pp. 1767-1785. For example, it was found that with an increase of the feed flow rate, permeate flux increased. It was also found that there is a linear relationship between the pressure and the permeate flux up to 30 bars. To investigate the effect of the concentration, 1 to 10 weight-% solutions of sucrose and glucose were utilized, whereby it was found that with an increase in the concentration, permeate flux decreased.

M. L. Bruening et al. (Department of Chemistry, Michigan State University, East Lansing, Mich. USA) have investigated the behaviour of multilayer polyelectrolyte membranes in "Nanofiltration with multilayer polyelectrolyte membranes", PMSE Preprints (2003), 89, 169. It is recited that minimum thickness of the polyelectrolyte films as nanofiltration membranes affords high flux in the nanofiltration. Furthermore, it was found that the charge was the primary factor in the nanofiltration of small neutral molecules (such as methanol and glycerol). It is also recited that a selectivity of more than 100 between larger neutral molecules (i.e. between glucose and sucrose) was achieved.

Chemistry and Industry of Forest Products, vol. 22, No. 1, 2002, pp. 77-81 discloses a review discussing the application of membrane separation in desalinization, concentration and purification of xylan extracts, separation of xylo-oligosaccharides from xylan hydrolysates, and the classification and purification of oligosaccharides. Examples of processing renewable plant resources using membrane separation are given. These include, for example, continuous ethanol fermentation coupled with membrane separation and the concentration of plant xylose solution by nanofiltration.

G. Yang et al. (Membrane Science and Technology Research Center, Nanjing University of Chemical Technology, Nanjing, China) discuss the nanofiltration of xylose in "Concentration of xylose solution through nanofiltration", Mo Kexue Yu Jishu (2000), 20(5), 21-26 (Journal written in Chinese). In this study, two types of spirally wound nanofiltration modules differing in the cut-off size were used to study the nanofiltration process of crude industrial xylose. It is recited that the xylose solution was concentrated from 4% to 20% in the nanofiltration retentate by a nanofiltration equipment comprising a 4-stage serial connection configuration.

G. S. Murthy et al. (Membrane Separations Group, Chemical Engineering Division, Indian Institute of Chemical Technology, Hyderabad, India) discuss the concentration of xylose by nanofiltration in "Concentration of xylose reaction liquor by nanofiltration for the production of xylitol sugar alcohol", Separation and Purification Technology 44 (2005) 221-228. Pilot scale nanofiltration experiments were carried out using a polyamide (PA) spiral membrane module having 300 molecular weight cut-off and 1 $m^2$ effective area. The concentrate (reject) flow rate was fixed and continuously recirculated to the feed tank through a heat exchanger. It is recited that at a feed pressure of 20 bar, xylose was concentrated from 2 to 10% at a reasonably high average flux of 24 l/l($m^2$h) and rejection of >99% which indicated negligible losses of the sugar in the permeate. The feed for the nanofiltration was an acid hydrolysate of rice husk. In accordance with this reference, xylose is concentrated in the nanofiltration retentate. The purity of concentrated xylose product in relation to the other components of the rice husk hydrolysate is not discussed.

WO 02/053783, Danisco Sweeteners Oy (published 11 Jul. 2002) discloses a process of producing a xylose solution from a biomass hydrolysate by subjecting the biomass hydrolysate to nanofiltration and recovering as the nanofiltration permeate a solution enriched in xylose. The aim in the process is to concentrate xylose in the nanofiltration permeate and to collect the total permeate in one permeate fraction. The feed used for the nanofiltration may be for example a spent sulphite pulping liquor containing a mixture of other closely-related monosaccharides, such as glucose, galactose, rhamnose, arabinose and mannose, in addition to the desired xylose. It was found that the nanofiltration effectively concentrated pentose sugars, such as xylose in the nanofiltration permeate, while hexose sugars remained in the nanofiltration retentate. However, the permeate obtained from the nanofiltration had a relatively low dry substance content (1 to 2%) and consequently a low xylose content. Furthermore, the xylose yields were low (less than 20%). Hereby the performance of the process was not sufficient for efficient industrial operation.

WO 02/053781, Danisco Sweeteners Oy (published 11 Jul. 2002) discloses a nanofiltration process of separating small molecular compounds from each other by nanofiltration, whereby the difference of the molar masses of the compounds to be separated is less than 1.9-fold, such as pentose sugars (xylose and arabinose) from hexose sugars (glucose, galactose, rhamnose, mannose), xylitol from sorbitol, betaine from erythritol as well as betaine from glucose and inositol. The aim in the nanofiltration is to concentrate the product in the nanofiltration permeate/retentate and to collect the total permeate/retentate in one permeate/retentate fraction.

WO 02/053783 and WO 02/053781 (Danisco Sweeteners) discussed above also disclose for example the chromatographic fractionation as a pretreatment step for the nanofiltration process as well as a test arrangement of recycling the permeate and/or retentate back to the feed vessel without product recovery (total recycling mode filtration).

US 2002/0158021 A (U.S. Pat. No. 6,692,577), Danisco Sweeterners Oy (published Oct. 31, 2002) discloses a process for purifying a maltose-containing liquor from undesired impurities, such as maltotriose. The process comprises nanofiltering the maltose-containing liquor and recovering a purified maltose solution as the nanofiltration permeate.

WO 2004/002938 A1, Finnfeeds Finland Oy (published 8 Jan. 2004), discloses a process for recovering betaine and sucrose by a combination of nanofiltration and chromatography from a sugar beet-derived solution, such as molasses solution. The nanofiltration and chromatographic fractionation steps may be carried out successively in any desired sequence. The reference also teaches that the nanofiltration permeate as it is obtained from the nanofiltration may be returned to the chromatographic fractionation to be used therein as the eluent.

WO 2004/003236 A1, Danisco Sweeteners Oy (published 8 Jan. 2004) discloses a nanofiltration process of removing crystallization inhibitors from sugars. In a typical embodiment of the process, the sugars are selected from monosaccharide sugars, such as xylose and fructose, and the crystallization inhibitors are selected from disaccharides and higher saccharides.

Nanofiltration of multicomponent mixtures as a rule aims at operating with as high yield as possible, which in general leads to a low performance, a lower flux, slower passing of the nanofiltration solution through the nanofiltration membrane, high membrane surface area demand and low purity of the desired product. All these phenomena accelerate towards the end of the nanofiltration process and together lead to decreased capacity of the nanofiltration process.

One way to solve the problems above is the selection of different membranes. In the present invention, however, the problems above have been solved by collecting the nanofiltration permeate/retentate in several fractions with different purity and recovering the desired component from the collected fractions with favourable processes to improve the performance of the process.

BRIEF DESCRIPTION OF THE INVENTION

The object of the present invention is thus to provide an improved nanofiltration process, which can be operated with a high flux (capacity) and with a high yield and purity of the desired component. The process of the invention is based on collecting the nanofiltration streams in separate fractions and recovering the desired component from these streams by selected operations and recycling at least one stream to the nanofiltration, depending on the purity or the impurity profile of each collected fraction.

The object of the invention is achieved by a process which is characterized by what is stated in the independent claims. The preferred embodiments of the invention are disclosed in dependent claims.

DETAILED DESCRIPTION OF THE INVENTION

The invention relates to a process for separating and recovering at least one component from a solution containing the same by nanofiltering the solution to obtain a nanofiltration permeate and a nanofiltration retentate, whereby the component to be recovered is enriched in the nanofiltration permeate or the nanofiltration retentate, which process comprises as an essential step:

(1) collecting the nanofiltration permeate and/or the nanofiltration retentate in more than one fraction to obtain more than one nanofiltration permeates fractions and/or more than one nanofiltration retentate fractions, whereby the collected nanofiltration permeate fractions and the collected nanofiltration retentate fractions have a different content on dry solids (DS) of the component to be recovered.

In one embodiment of the invention, the process further comprises:

(2) recycling at least one of the collected nanofiltration permeate and/or nanofiltration retentate fractions to the nanofiltration, optionally through at least one further separation operation.

In a still further embodiment of the invention, when the component to be recovered is enriched in the nanofiltration permeate, the process further comprises (3a) recovering the component from at least one of the collected nanofiltration permeate fractions by a first recovery operation and subjecting at least one of the other collected nanofiltration permeate fractions to a second recovery operation, further separation operation or recycling to the nanofiltration.

In a still further embodiment of the invention, when the component to be recovered is enriched in the nanofiltration retentate, the process further comprises:

(3b) recovering the component from at least one of the collected nanofiltration retentate fractions by a first recovery operation and subjecting at least one of the other collected nanofiltration retentate fractions to a second recovery operation, further separation operation or recycling to the nanofiltration.

The component to be recovered in accordance with the process of the invention is selected from compounds having a molecular weight less than 1000 g/mol, preferably less than 500 g/mol and most preferably less than 200 g/mol. The compounds are typically selected from carbohydrates, preferably sugars and sugar alcohols. The sugars to be recovered may be monosaccharides, which may be aldoses, such as xylose, glucose, arabinose, mannose and galactose, and ketoses, such as fructose, tagatose and xylulose, or disaccharide sugars, such as maltose, isomaltulose and saccharose. The component to be recovered may also be selected from sugar alcohols, such as xylitol, maltitol, inositol and erythritol. The component to be recovered may also be betaine.

The solution used as the starting solution in the process of the invention may be any multicomponent mixture containing the above-mentioned compounds, such as carbohydrates, preferably sugars and/or sugar alcohols. The sugar alcohols may be derived from the sugars by hydrogenation. The mixture may contain monosaccharide sugars, such as xylose, fructose, glucose, arabinose, mannose, galactose and rhamnose, and disaccharide sugars, such as maltose, isomaltulose and saccharose, as well as higher saccharides, and/or sugar alcohols thereof, such as maltitol, inositol and erythritol.

In further embodiments of the invention, the starting solution may be a fermentation liquor, molasses or vinasse, for example.

In another embodiment of the invention, the starting solution may be a hydrolysate of plant-based biomass, for example a hydrolysate of xylan-containing vegetable material or a hydrolyzate of lignosellulosic material, such as wood material, which may be softwood or hardwood. One example of useful starting materials is a spent liquor obtained from a pulping process. The spent liquor may be a spent sulphite pulping liquor, such as an acid spent sulphite pulping liquor, which may be obtained from hardwood sulphite pulping. The starting material may also be a hydrolysate derived from hardwood, straw, corn cobs, corn husks, corn fibers and sugar beet.

In another embodiment of the invention, the starting solution may be a fraction obtained by any separation process from the plant-based biomass hydrolysates described above. The starting solution may thus be a fraction obtained from chromatographic fractionation, ultrafiltration or crystallization, for example.

In another embodiment of the invention, the solution used as the starting material may be a fructose solution obtained from starch by hydrolysis and isomerization. The starting solution may also be a fructose solution obtained from hydrolyzed and isomerized saccharose.

In a further embodiment of the invention, the solution used as the starting material may be a maltose syrup obtained from the hydrolysis of starch. The process of the invention provides permeates with different maltose contents, which may be hydrogenated to produce maltitol solutions with different maltitol contents and consequently varying impurity contents. For example, special noncariogenicity is reported for a maltitol product containing less than 3% oligosaccharides with a degree of polymerization (DP) of more than 20.

The content of the component to be recovered in the starting solution may be in the range of 1 to 95% on DS, preferably less than 85%, more preferably less than 60% and most preferably less than 50% on DS.

In the process of the present invention, the desired component may be recovered from the nanofiltration permeate or the nanofiltration retentate, depending on whether the component is enriched in the nanofiltration permeate or retentate, i.e. whether the concentration of the desired component (% on dry solids) is higher in the permeate or retentate compared to the concentration in the feed. For example, in the case of xylose and fructose, both may be enriched in the nanofiltration permeate and thus recovered from the nanofiltration permeate.

Especially, when the solution to be nanofiltered (the nanofiltration feed) contains the desired component in relatively low amounts, the enrichment of the component to the permeate and the flux of the component is decreasing when filtering is advancing. Instead of collecting all the permeate into one fraction with low enrichment, it has now been observed that it is advantageous to collect fractions having a different enrichment factor separately and recover the desired component from the fractions with an effective recovery process. Thus the performance of the nanofiltration can be improved and the yield of the desired component can be increased by selecting the recovery process or the recycling operation appropriately.

In accordance with step (1) of the process of the invention, the nanofiltration permeate and/or the nanofiltration retentate are/is collected in more than one fraction to obtain more than one nanofiltration permeate/retentate fractions, which have a different content of the component to be recovered, on the dry solids (DS) basis. The collected permeate/retentate fractions are then utilized in different ways depending on the purity (impurity profile) of the nanofiltration retentate/permeate fraction.

Step (1) of the process of the present invention provides nanofiltration permeate/retentate fractions, which differ in the content (purity) of the component to be recovered. The relative difference between the contents (purities) of the component to be recovered in the different collected nanofiltration permeate/retentate fractions is typically more than 5%, preferably more than 10%, most preferably more than 20% and especially more than 30%. The absolute difference between the contents (purities) of the component to be recovered in the collected nanofiltration permeate/retentate fractions may be more than 1, preferably more than 5 and most preferably more than 10 percentage units. The difference in the content of the component to be recovered depends on the solution to be separated and the desired use of the collected fractions.

The nanofiltration may comprise one or more nanofiltration stages. When the nanofiltration is carried out in one stage with a batch mode (in one nanofiltration unit), said one or more nanofiltration permeate/retentate fractions are collected timewise according to the concentration factor from the same nanofiltration stage. When the nanofiltration is carried out in several stages in batch mode or in continuous mode (several successive nanofiltration units), said one or more nanofiltration fractions are collected as one fraction or as several fractions from each nanofiltration stage. The nanofiltration permeate/retentate is typically collected in 2 to 10 fractions, preferably in 2 to 4 fractions.

In accordance with step (2) of the process of the invention, at least one of the collected nanofiltration permeate/retentate fractions is recycled to the nanofiltration operation, optionally through at least one further separation operation.

Recycling is typically carried out upstream in the process. However, recycling may also be carried out in downstream mode, for example in such an embodiment of the invention, where the collected nanofiltration permeate is introduced from a preceding nanofiltration stage to a subsequent nanofiltration stage for use as diafiltration water. Diafiltration water in connection with the present invention refers to dilution water, which is mixed with the nanofiltration feed to maintain the dry substance content of the feed (and nanofiltration concentrate) at a suitable value for nanofiltration.

The content of the desired component in the nanofiltration permeate/retentate fraction(s) to be recycled may be in the range of 5 to 85% on DS. In one preferred embodiment of the invention, the permeate/retentate fraction to be recycled has a relatively low content of the desired component, for example less than 50% on DS or less than 20% on DS.

Said further separation operation in step (2) of the process of the invention before recycling back to the nanofiltration may be selected from chromatographic fractionation, ion exchange, membrane filtration, such as ultrafiltration and nanofiltration, reverse osmosis, electrodialysis, evaporation and filtration, for example.

In one preferred embodiment of the invention, said further separation operation before recycling back to the nanofiltration comprises chromatographic fractionation. The chromatographic fractionation provides a fraction enriched in the desired component, which is then recycled to the nanofiltration. The content of the desired component in the fraction obtained from the chromatographic fractionation may be in the range of 5 to 97%, preferably 20 to 60% on DS, more preferably 40 to 60% on DS.

Step (3a) of the process of the invention relates to components which are enriched in the nanofiltration permeate. In accordance with step (3a) of the process of the invention, the desired component or components is/are recovered from at least one of the collected nanofiltration permeate fractions by a first recovery operation, whereas at least one of the other collected nanofiltration permeate fractions is subjected to a second recovery operation of the desired component, a further separation operation or recycling to the nanofiltration.

In a preferred aspect of this embodiment of the invention, the nanofiltration retentate is collected in one fraction and recycled to the nanofiltration, optionally through at least one further separation operation.

In one embodiment of the invention, the nanofiltration retentate and permeate are collected in more than one fraction and at least one of the collected fractions is recycled to the nanofiltration, optionally through at least one further separation operation.

Step (3b) of the process of the invention relates to components which are enriched in the nanofiltration retentate. In accordance with step (3b) of the process of the invention, the desired component is recovered from at least one of the collected nanofiltration retentate fractions by a first recovery operation, whereas at least one of the other collected nanofiltration retentate fractions is subjected to a second recovery operation of the desired component, a further separation operation or recycling to the nanofiltration.

In a preferred aspect of this embodiment of the invention, the nanofiltration permeate is collected in one fraction and recycled to the nanofiltration, optionally through at least one further separation operation.

The first recovery operation in step (3a)/(3b) of the process of the invention is typically selected from crystallization, such as boiling crystallization, cooling crystallization and a combination of boiling and cooling crystallization. The content of the desired component in the nanofiltration permeate/retentate fraction(s), which is/are subjected to the first recovery operation, may be in the range of 5 to 95%, preferably 20 to 90% on DS. The first recovery operation by the crystallization methods described above is preferably applied to nanofiltration retentate/permeate fractions having a relatively high purity of the desired component, for example more than 50% on DS and preferably more than 75% on DS. The mother liquor obtained from the crystallization may be recycled to the nanofiltration.

The second recovery operation in step (3a)/(3b) of the process of the invention typically comprises precipitation crystallization. The content of the desired component in the nanofiltration retentate/permeate fractions, which are subjected to the second recovery operation, may be in the range of 5 to 80%. However, the second recovery operation is typically applied to nanofiltration retentate/permeate fractions having a relatively low content of the desired component, for example less than 70%, preferably less than 50% and most preferably less than 30% on DS. The mother liquor obtained from the precipitation crystallization may be recycled to the nanofiltration.

Said further separation operation in step (3a)/(3b) of the process of the invention may be selected for example from chromatographic fractionation, ion exchange, membrane filtration, such as ultrafiltration and nanofiltration, reverse osmosis, electrodialysis, evaporation and filtration. Said further separation operation is typically applied to nanofiltration retentate/permeate fractions having a relatively low content of the desired component, for example less than 70%, preferably less than 50% and most preferably less than 30% on DS. In this way, the desired component is further enriched. The fraction enriched in the compound to be recovered may be recycled to the nanofiltration like in step (2) of the process.

Alternatively, at least one of the collected nanofiltration permeate/retentate fractions obtained from step (3a/3b) of the process may be recycled to the nanofiltration. The recycling operation is typically applied to nanofiltration retentate/permeate fractions having a relatively low content of the desired component, for example less than 70%, preferably less than 50% and most preferably less than 30% on DS.

The yield of the nanofiltration together with said further separation operation of step (3a)/(3b) of the process of the invention, such as chromatographic fractionation, is typically more than 25%, preferably more than 50% and most preferably more than 90% and especially more than 95% of the desired component.

The flux of the desired compound in the nanofiltration is typically in the range of 0.05 to 50 kg m$^{-2}$h$^{-1}$ of the component to be recovered.

In one embodiment of the invention, where the desired component is enriched in the nanofiltration permeate, the nanofiltration permeate is collected in several fractions, whereas the nanofiltration retentate is collected in one fraction and recycled to the nanofiltration, preferably through a further separation operation, such as chromatographic fractionation. This embodiment may be preferably applied for example to the separation and recovery of xylose.

In another embodiment of the invention, where the desired component is enriched in the nanofiltration retentate, the nanofiltration retentate is collected in several fractions, whereas the nanofiltration permeate is collected in one fraction and recycled to the nanofiltration, preferably through a further separation operation, such as chromatographic fractionation, or crystallization.

In one aspect of this embodiment of the invention, one of the collected nanofiltration retentate fractions is recycled to the nanofiltration and at least one of the other collected nanofiltration retentate fractions having a different content of the component to be recovered is recycled to chromatographic fractionation.

In a further embodiment of the invention, the nanofiltration permeate is collected in more than one fraction, one of which is recycled to the nanofiltration and one of the other collected nanofiltration permeate fractions is recycled through a further separation operation, and the nanofiltration retentate is collected in more than one fraction to produce more than one nanofiltration retentate fractions.

The nanofiltration permeate/retentate fractions to be recycled, optionally after a further separation operation, may be mixed with the nanofiltration feed and then recycled to the nanofiltration.

In one embodiment of the invention, at least one of the collected nanofiltration permeate fractions is recycled to the nanofiltration for use as diafiltration water. This embodiment of the invention is typically applied to nanofiltrations, where the nanofiltration is started with a feed having a relatively low dry substance content (typically less than 13%) and the component to be recovered is enriched in the nanofiltration permeate and where the nanofiltration comprises more than one stages. The first nanofiltration stage acts as a concentration increasing stage, producing a retentate with a relatively high dry substance content and a permeate with a relatively low dry substance content. In one practical embodiment, the collected nanofiltration permeate with a relatively low dry substance content from the first stage is recycled downstream to a subsequent nanofiltration stage and mixed as diafiltration water with the feed of the subsequent nanofiltration stage, i.e. the nanofiltration retentate which comes from the preceding nanofiltration stage and has a relatively high dry substance content. The desired component in an enriched form and with a good yield is then recovered from the nanofiltration permeate of the subsequent nanofiltration stage.

The nanofiltration in accordance with the present invention may be carried out as a batch process or a continuous process.

The nanofiltration is typically carried out at a temperature in the range of 10 to 150° C., preferably 30 to 95° C. and most preferably 40 to 70° C. The pressure in the nanofiltration is typically in the range of 5 to 90 bar, preferably 10 to 70 bar and most preferably 20 to 45 bar. The pH may be in the range of 1 to 10, preferably 2 to 8 and most preferably 3 to 6. The pH depends on the composition of the starting solution and the membrane used for the nanofiltration and the stability of the components to be recovered. If necessary, the pH of the starting solution may be adjusted to the desired value before nanofiltration.

The nanofiltration membrane used in the present invention can be selected from polymeric and inorganic membranes having a cut-off size of 100-2500 g/mol, preferably 150 to 1000 g/mol, most preferably 150 to 500 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. The nanofiltration membranes used in the present invention may also be selected from cellulose acetate membranes.

Typical inorganic membranes include $ZrO_2$- and $Al_2O_3$- membranes, for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

In one embodiment of the invention, different nanofiltration membranes may be used in different nanofiltration stages.

The typical form of nanofiltration membranes comprises spiral wound membranes. The membrane configuration may also be selected e.g. from flat sheets, tubes and hollow fibers.

"High shear" membranes, such as vibrating membranes and rotating membranes can also be used.

Before the nanofiltration procedure, the nanofiltration membranes may be pretreated with alkaline detergents, acidic agents or ethanol, for example. The membranes may also be washed with an alkaline detergent, an acidic agent or ethanol during the nanofiltration process, when necessary.

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters and controllers. The equipment may also include several nanofiltration membrane elements in different combinations, arranged in parallel or in series or in one or several pressure vessel(s).

In one embodiment of the invention, the first stage of the nanofiltration may comprise reverse osmosis.

The chromatographic fractionation as a further separation operation in step (2) and (3a)/(3b) of the process of the invention may be carried out with different separation resins as the column packing material for the fractionation.

In one embodiment of the invention, the column packing material may be selected from cation exchange resins, which may be strongly acid cation exchange resins or weakly acid cation exchange resins. The resin may be in a monovalent and/or divalent metal form, such as $Na^+$ and/or $K^+$ form, or $Ca^{2+}$, $Ba^{2+}$, $Mg^{2+}$, $Fe^{3+}$ and/or $Sr^{2+}$ form. The resin may also be in a trivalent metal form, such as in $Al^{3+}$ form.

The resins may have a styrene or acrylic skeleton. The resins are preferably cross-linked with from about 1 to about 20% divinylbenzene, preferably from about 3 to about 8% divinylbenzene.

In another embodiment of the invention, the column packing material may be selected from anion exchange resins, which are typically weakly basic anion exchange resins, having preferably an acrylic skeleton. Strongly basic anion exchange resins are also useful in the present invention.

The average particle size of the resin is normally 10 to 2000 μm, preferably 100 to 400 μm.

The resins are preferably gel-type resins.

Manufacturers of resins are for example Finex, Dow, Bayer, Mitsubishi and Rohm & Haas.

Zeolites, carbonaceous pyropolymers and activated carbon bound to a polymer are also useful as column packing materials in the chromatographic fractionation.

In the chromatographic fractionation operation, the cations/anions of the resin are preferably in substantial equilibrium with the cations/anions of the mobile phase of the system.

An especially preferred column packing material in the chromatographic fractionation step of the process of the invention is a strongly acid cation exchange resin in a divalent metal form, which is predominantly in $Mg^+$ and/or $Ca^+$ form. The resin has preferably a styrene skeleton, and the resin is preferably crosslinked with divinylbenzene.

The eluent used in the chromatographic separation step of the invention is preferably water or evaporation condensate, but even solutions of salts and water are useful. Furthermore, alcohols, such as ethanol, and mixtures of water and alcohol, such as a mixture of water and ethanol are useful eluents.

The temperature of the chromatographic fractionation depends on the components to be separated and the selected resin, for instance. The temperature in the chromatographic fractionation is typically in the range of 50 to 100° C., preferably 55 to 90° C.

The chromatographic fractionation may be carried out as a batch process or a continuous process, such as a simulated moving bed process (SMB process).

In a simulated moving bed process, the chromatographic fractionation is typically carried out using 2 to 14 columns connected in series. The columns are interconnected with pipelines. Flow rate in the columns is typically 0.5 to 10 $m^3/(hm^2)$ of the cross-sectional area of the column. Columns are filled with a column packing material selected for example from those described above. The columns are provided with feed lines and product lines so that the feed solution and the eluent can be fed into the columns and the product fractions collected from the column. The product lines are provided with on-line instruments so that the quality/quantity of the production can be monitored during operation.

As described above, the desired product may be recovered by various crystallization methods in step (3a)/(3b) of the process. The crystallization methods may be selected from cooling crystallization, boiling crystallization, a combination of boiling and cooling crystallization and precipitation crystallization or combinations thereof.

In the cooling crystallization process, the solution containing the desired compound is first evaporated to an appropriate dry substance content (e.g. to a DS content of about 60 to 80%) depending on the content and the solubility of the compound in the solution. The slightly supersaturated solution may be seeded with seed crystals of the compound. The seeds, if used, are pulverized crystals in a dry form or they are suspended in a crystallization solvent, which may be water, an alcohol, such as ethanol, or a mixture thereof. A typical crystallization solvent is water or an organic solvent, such as an alcohol, for example ethanol. After seeding, the crystallization mass is subjected to cooling to a temperature of 90 to 10°, preferably to a temperature of 75 to 20° C. with simultaneous mixing until the crystallization yield or viscosity is optimal for the separation of crystals. Some additional crystallization solvent may be added during cooling to improve the crystallization yield or the crystal separation performance. The crystallization mass may then be mixed at the final temperature for a period of time, preferably 0.5 to 24 hours, to reach the maximum crystallization yield. The crystals are separated from the mother liquor for example by filtration or centrifugation. The crystal cake is washed with the crystallization solvent and optionally dried to obtain a product with a high quality.

In another embodiment of the invention, the crystallization is carried out by boiling crystallization combined with cooling crystallization. The crystallization solvent may be water, an organic solvent, such as an alcohol, for example ethanol, or a mixture thereof. The solution containing the desired compound is first evaporated to slight supersaturation at the boiling point of the solution. The solution is seeded and the evaporation is continued at the boiling point of the crystallization mass (i.e. the mixture of the supersaturated solution and crystals) with continuous feed of the feed solution to obtain improved crystal size, crystal size distribution and yield, until a crystallization mass is obtained, in which the crystal yield is 1 to 60% on the desired compound, and the dry solids content of the mass is over 60% by weight. The evaporation is preferably carried out at a temperature of 50 to 70° C. After boiling crystallization, the crystallization mass is subjected to cooling with simultaneous mixing until the crystallization yield or viscosity is optimal for the separation of crystals. The cooling time is preferably 10 to 60 hours. The temperature drop during cooling is preferably 5 to 40° C., depending on the boiling crystallization yield and the crystal size distribution. Additional crystallization solvent may be added during cooling to further improve the crystallization yield and the crystal separation performance. The crystallization mass may then be mixed at the final temperature for a period of time, preferably 0.5 to 24 hours, to reach maximum crystallization yield of 5 to 80%. The crystals are separated from the mother liquor for example by filtration or centrifugation. The crystal cake is washed with the crystallization solvent and optionally dried to obtain crystals with high quality.

In the precipitation crystallization, the crystallization is essentially carried out by means of nucleation. The precipitation crystallization is preferably carried out at high viscosity and at high supersaturation and it may include boiling and cooling stages, or both.

The precipitation crystallization may be carried out as described in U.S. Pat. No. 5,980,640. In one embodiment of the invention, the precipitation crystallization can be carried out starting from the purity of more than 35%, preferably more than 45% of the desired compound. The solution is evaporated to a concentration higher than 75% to bring the solution to sufficient supersaturation to effect nucleation at a temperature of 60 to 70° C. The crystallization mass is then cooled under agitation until the viscosity of the crystallization mass is high, typically over 50 Pas. The agitation is continued at a temperature of 20 to 40° C. until the crystallization has proceeded sufficiently. Thereafter, the viscosity of the crystallization mass is adjusted to an adequate value (10 to 50 Pas) for the separation of the crystals by adding water or optionally an organic solvent. The crystals are then separated by centrifugation or filtration, for example using a pressure filter. The content of the desired compound in the crystals thus obtained is typically more than 60%, preferably more than 70%. Washing the crystals will produce crystals, which have an increased purity (higher than 75%).

One especially preferred embodiment of the invention relates to the separation and recovery of xylose from a plant-based biomass hydrolyzate, which process comprises the following steps:

subjecting the biomass hydrolysate to nanofiltration and collecting the nanofiltration retentate in one fraction and the nanofiltration permeate in several fractions, subjecting the collected nanofiltration retentate to chromatographic fractionation to provide a fraction enriched in xylose, recycling the fraction enriched in xylose thus obtained to nanofiltration, and recovering xylose, optionally by crystallization, from at least one of the nanofiltration permeate fractions and subjecting the other collected nanofiltration permeate fractions to other operations, such as a further separation operation or recycling to the nanofiltration.

The chromatographic fractionation stage may be carried out before and/or after the nanofiltration.

In a preferred embodiment of this aspect of the invention, xylose is recovered from one nanofiltration permeate fraction by product crystallization and from another nanofiltration permeate fraction by intermediate crystallization. The product crystallization is typically carried out by boiling crystallization, cooling crystallization or a combination of boiling and cooling crystallization. The intermediate crystallization may be carried out by precipitation crystallization.

The above-described combination of nanofiltration and chromatographic fractionation including recycling the nanofiltration retentate to the chromatographic fractionation provides an improved yield of xylose compared to a corresponding combination without recycling the retentate to the chromatographic fractionation. Furthermore, the process provides a higher flux. The process may also be carried out with a nanofiltration equipment, which requires a smaller membrane surface area.

In the examples and throughout the specification and claims, the following definitions have been used:

DS refers to the dry substance content measured by Karl Fischer titration, expressed in % by weight.

Purity refers to the content of the desired component in the product or fraction, expressed in % on DS.

Flux refers to the amount (kg) of the solution that permeates through the nanofiltration membrane during one hour calculated per one square meter of the membrane surface, $kg/(m^2h)$.

Retention refers to the proportion of the measured compound retained by the membrane. The higher the retention value, the less is the amount of the compound transferred through the membrane:

Retention(%)=[(Feed−Permeate)/Feed]×100, where "Feed" refers to the concentration of the compound in the feed solution (expressed e.g. in g/l) and "Permeate" refers to the concentration of the compound in the permeate solution (expressed e.g. in g/l).

HPLC refers to liquid chromatography.

SMB refers to simulated moving bed chromatography.

NF refers to nanofiltration.

DVB refers to divinylbenzene.

For instance the following membranes are useful in the present invention:

Desal-5 DK (a four-layered membrane consisting of a polyester layer, a polysulfone layer and two proprietary layers, having a cut-off size of 150 to 300 g/mol, permeability (25° C.) of 5.4 $l/(m^2h\ bar)$ and $MgSO_4$-retention of 98% (2 g/l), manufacturer GE Osmonics), Desal-5 DL (a four-layered membrane consisting of a polyester layer, a polysulfone layer and two proprietary layers, having a cut-off size of 150 to 300 g/mol, permeability (25° C.) of 7.6 $l/(m^2h\ bar)$, $MgSO_4$-retention of 96% (2 g/l), manufacturer GE Osmonics), NTR-7450 (a sulfonated polyethersulfone membrane having a cut-off size of 500 to 1000 g/mol, permeability (25° C.) of 9.4 $l/(m^2h\ bar)$, NaCl-retention of 51% (5 g/l), manufacturer Nitto Denko), and NF-270 (a polypiperazine membrane having a cut-off size of 200 g/mol, permeability (25° C.) of 7-8 $l/(m^2h\ bar)$, NaCl-retention of 70%, manufacturer Dow Deutschland), TS-80 (manufacturer Trisep), ATF-60 (manufacturer PTI Advanced Filtration Inc.), Desal AG (manufacturer Osmonics), Desal G10 (a thin film membrane of aromatic polyamide/polysulfone material having a cut-off size of 2500 g/mol, permeability (25° C.) of 3.4 $l/(m^2h\ bar)$, NaCl-retention of 10%, retention of dextrane (1500 g/ml) of 95%, retention of glucose of 50%, manufacturer GE Osmonics), ASP 10 (a membrane consisting of sulfonated polysulfone on polysulfone, having a permeability (25° C.) of 16 $l/(m^2h\ bar)$, NaCl-retention of 10%, manufacturer Advanced Membrane Technology), TS 40 (a membrane consisting of fully aromatic polyamide, having a permeability (25° C.) of 5.6 $l/(m^2h\ bar)$, manufacturer TriSep), ASP 20 (a membrane consisting of sulfonated polysulfone on polysulfone, having a permeability (25° C.) of 12.5 $l/(m^2h\ bar)$, NaCl-retention of 20%, manufacturer Advanced Membrane Technology), MPS-34 (a composite membrane having a cut-off size of 200 g/mol and a glucose retention of 95% for a 5% glucose solution, manufacturer Koch), MPF-36 (manufacturer Koch).

The following examples illustrate the invention. The examples are not construed to limit the invention in any way.

Example 1

Chromatographic Separation of Spent Liquor

The test equipment included a separation column, a feed pump, a heat exchanger, inlet valves for the feed and the eluent as well as flow control means for the out-coming liquid. The height of the chromatographic resin bed in the separation column was 1.56 m and the column had a diameter of 0.09 m. The column was packed with a strong acid gel type cation exchange resin (Finex CS 13 GC) in $Mg^{2+}$-form. The divinylbenzene content of the resin was 6.5%. The mean bead size of the resin was 0.38 mm.

As a feed, spent liquor from $Mg^{2+}$ based sulphite cooking was used and the aim was to separate the xylose contained therein.

Before the test, feed liquor was filtered with a Seitz pressure filter using Arbocell B800 as a filtering aid (precoat 1 kg/m², bodyfeed 0.5% on DS basis) and the feed dry substance was adjusted to 28.3 g/100 g. The properties of the feed are set forth in the table below, whereby the percentages are given on a dry substance weight basis.

TABLE E1-I

| Composition of the feed | |
|---|---|
| pH | 3.6 |
| Conductivity, mS/cm | 13.1 |
| Xylose, % on DS | 15.2 |
| Glucose, % on DS | 2.2 |
| Other sugars, % on DS | 3.9 |
| Others, % on DS | 78.7 |

The feed and the eluent were used at a temperature of 65° C. and water was used as the eluent. The feed volume was 0.83 liters and the flow rate for the feed and elution was 3.0 l/h.

After equilibration of the system with three balancing feeds, the following fractions were drawn from the system: a residual fraction, two recycle fractions and a xylose product fraction. The result including HPLC analyses for the residual fraction, combined product fractions recycle fraction and the xylose fraction are set forth in the table below.

TABLE E1-II

| | Residual | Recycle | Xylose |
|---|---|---|---|
| Volume, l | 2.4 | 0.6 | 0.9 |
| Dry solids, g/100 ml | 7.4 | 4.6 | 7.0 |
| Xylose, % on DS | 1.3 | 29.0 | 49.5 |
| Glucose, % on DS | 0.7 | 6.0 | 5.3 |
| Other sugars, % on DS | 0.5 | 6.9 | 9.8 |
| Others, % on DS | 97.5 | 58.1 | 35.4 |

The yield calculated from the product fractions was 93.1% for xylose.

Example 2

Chromatographic Separation of a Xylose-Containing Nanofiltration Concentrate

The test equipment as described in Example 1 was used. As a feed, a xylose-containing concentrate (retentate) obtained from nanofiltration of spent liquor from $Mg^{2+}$ based sulphite cooking (MgSSL) was used and the aim was to separate the xylose contained therein. The nanofiltration was carried out as described in Example 4 hereinafter.

Before the test, the feed liquor was filtered with a Seitz pressure filter using Arbocell B800 as a filtering aid (precoat 1 kg/m², bodyfeed 0.5% on DS basis) and the feed dry substance was adjusted to 28.9 g/100 g. The properties of the feed are set forth in the table below, whereby the percentages are given on a dry substance weight basis.

TABLE E2-I

| Composition of the feed | |
|---|---|
| pH | 3.3 |
| Conductivity, mS/cm | 17.2 |
| Xylose, % on DS | 18.0 |
| Glucose, % on DS | 3.3 |
| Other sugars, % on DS | 7.7 |
| Others, % on DS | 71.0 |

The feed and the eluent were used at a temperature of 65° C. and water was used as the eluent. The feed volume was 0.83 liters and the flow rate for the feed and elution was 3.0 l/h.

After equilibration of the system with three balancing feeds, the following fractions were drawn from the system: a residual fraction, two recycle fractions and a xylose product fraction. The results including HPLC analyses for the residual fraction combined recycle fractions and the xylose fraction are set forth in the table below.

TABLE E2-II

| | Residual | Recycle | Xylose |
|---|---|---|---|
| Volume, l | 1.9 | 0.5 | 1.7 |
| Dry solids, g/100 ml | 4.6 | 6.5 | 8.5 |
| Xylose, % on DS | 3.3 | 13.8 | 29.4 |
| Glucose, % on DS | 1.4 | 3.5 | 4.5 |
| Other sugars, % on DS | 2.4 | 6.6 | 11.7 |
| Others, % on DS | 92.9 | 76.1 | 54.4 |

The yield calculated from the product fractions was 93.6% for xylose.

Example 3

Chromatographic Separation of a Mixture of Spent Liquor and a Nanofiltration Concentrate The test equipment as described in Example 1 was used. As a feed, a mixture made from spent liquor of $Mg^{2+}$ based sulphite cooking and a xylose-containing nanofiltration concentrate was used and the aim was to separate the xylose contained therein. The mixture contained 92% spent liquor and 8% of the nanofiltration concentrate on the dry substance basis. The xylose-containing nanofiltration concentrate was obtained from the same source as in Example 2.

Before the test, the feed liquor was filtered with a Seitz pressure filter using Arbocell B800 as a filtering aid (precoat 1 kg/m², bodyfeed 0.5% on DS basis) and the feed dry substance was adjusted to 28.6 g/100 g. The properties of the feed are set forth in the table below, whereby the percentages are given on a dry substance weight basis.

TABLE E3-I

| Composition of the feed | |
|---|---|
| Dry substance, g/100 g | 28.6 |
| PH | 3.6 |
| Conductivity, mS/cm | 13.7 |
| Xylose, % on DS | 16.1 |
| Glucose, % on DS | 2.4 |
| Other sugars, % on DS | 3.9 |
| Others, % on DS | 77.6 |

The feed and the eluent were used at a temperature of 65° C. and water was used as the eluent. The feed volume was 0.83 liters and the flow rate for the feed and elution was 3.0 l/h.

After equilibration of the system with three balancing feeds, the following fractions were drawn from the system: a residual fraction, two recycle fractions and a xylose product fraction. The results including HPLC analyses for the residual fraction, combined recycle fractions and the xylose fraction are set forth in the table below.

TABLE E3-II

|  | Residual | Recycle | Xylose |
|---|---|---|---|
| Volume, l | 2.2 | 0.5 | 1.1 |
| Dry solids, g/100 ml | 7.5 | 4.7 | 6.8 |
| Xylose, % on DS | 1.7 | 22.1 | 46.4 |
| Glucose, % on DS | 0.6 | 4.1 | 5.8 |
| Other sugars, % on DS | 0.7 | 6.1 | 10.4 |
| Others, % on DS | 97.0 | 67.7 | 37.4 |

The yield calculated from the product fractions was 92.5% for xylose.

Example 4

Process with a Combination of Chromatographic Separation and Nanofiltration

The aim of this example was to separate and recover xylose from spent liquor from the $Mg^{2+}$ based sulphite cooking. The process equipment included a simulated moving bed chromatographic separation unit and a continuous nanofiltration unit.

The chromatographic separation unit included five columns connected in series, a feed pump, a heat exchanger, recycling pumps, an eluent water pump, flow controls for liquid flows as well as inlet and product valves for the various process streams. The total length of the resin bed was 20 m and the columns were packed with a strong acid gel type cation exchange resin (Finex CS 13 GC) in $Mg^{2+}$-form. The mean bead size of the resin was 0.38 mm. The divinylbenzene content of the resin was 6.5%.

The nanofiltration unit included three stages in series, a feed pump, recycling pumps, a diafiltration water pump, flow and density controls for liquid flows as well as inlet and product valves for the various process streams. Osmonics Desal 5 DL spiral wound membranes were used and the conditions in filtration were set to an inlet pressure of 33 bar and a temperature of 65° C.

As a raw material xylose-containing spent liquor from $Mg^{2+}$ based sulphite cooking (MgSSL) was used and the aim was to separate the xylose contained therein. The composition of the spent liquor is set forth in the table below, whereby the percentages are given on a dry substance weight basis.

TABLE E4-I

| Composition of MgSSL | |
|---|---|
| Dry substance, g/100 g | 62.5 |
| PH | 3.3 |
| Xylose, % on DS | 15.0 |
| Glucose, % on DS | 2.1 |
| Other sugars, % on DS | 3.2 |
| Xylonic acid | 5.5 |
| Others, % on DS | 74.2 |

The separation feed was diluted to approximately 53 g/100 g with the separation recycle fraction. The feed liquor was filtered with a Seitz pressure filter using Arbocell B800 as a filtering aid (precoat 1 $kg/m^2$, bodyfeed 0.5% on DS basis) and the feed dry substance was finally adjusted to 48 g/100 g with the separation recycle fraction and the evaporation condensate.

The feed and the eluent were used at a temperature of 70° C. and the condensate obtained from the evaporation was used as an eluent. The feed rate to the separation was 66.6 kg dry substance in hour per one $m^3$ of the separation resin.

After equilibration of the process, the following samples were collected: a residual fraction from each column, recycle fractions from columns 3 and 5 and a xylose product fraction from column 5. The results including HPLC analyses for feed, the combined residual fraction, combined recycle fraction and for the combined xylose fraction are set forth in the table below.

TABLE E4-II

|  | Feed | Residual | Recycle | Xylose |
|---|---|---|---|---|
| Volume, % bed volume | 12.5 | 18.7 | 5.5 | 6.3 |
| Dry solids, g/100 ml | 60.0 | 23.3 | 30.2 | 27.9 |
| Xylose, % on DS | 16.6 | 1.0 | 22.9 | 46.5 |
| Glucose, % on DS | 2.9 | 0.6 | 5.6 | 5.4 |
| Other sugars, % on DS | 3.8 | 0.3 | 5.8 | 9.9 |
| Xylonic acid | 6.5 | 2.6 | 10.0 | 11.8 |
| Others, % on DS | 70.3 | 95.5 | 55.7 | 26.4 |

The xylose fraction (pH ~3.0) obtained from the chromatographic separation was subjected to the nanofiltration. Nanofiltration was operated with a xylose yield of 90% and the dry substance of the concentrate was adjusted to 26 g/100 g with condensate. In the equilibrium conditions, the final concentrate and permeate samples from each three stages were collected. The results including HPLC analyses for the concentrate fraction, for the permeate fractions and for the combined permeate fraction are set forth in the table below.

TABLE E4-III

|  | Concentrate Final | Permeate stage1 | Permeate stage2 | Permeate stage3 | Permeate combined |
|---|---|---|---|---|---|
| Flux, $kg/h/m^2$ | 0.24 | 0.90 | 0.50 | 0.15 | 0.61 |
| Dry solids, g/100 g | 26 | 15.1 | 13.5 | 11.5 | 14.5 |
| Xylose, % on DS | 15.6 | 57.1 | 49.9 | 42.5 | 55.1 |

TABLE E4-III-continued

|  | Concentrate Final | Permeate stage1 | Permeate stage2 | Permeate stage3 | Permeate combined |
|---|---|---|---|---|---|
| Glucose, % on DS | 3.7 | 5.6 | 6.2 | 6.7 | 5.6 |
| Other sugars, % on DS | 5.0 | 10.7 | 11.6 | 12.1 | 11.1 |
| Xylonic acid | 8.9 | 12.0 | 12.9 | 13.6 | 12.1 |
| Others, % on DS | 66.8 | 14.6 | 19.4 | 25.1 | 16.1 |

The separation yield (from the chromatographic fractionation) calculated from the product fractions is 95% for xylose.

The nanofiltration yield calculated from the product fractions is 90% for xylose.

The combined yield including chromatographic separation and nanofiltration is 86% for xylose.

The nanofiltration flux calculated from the product fractions is 0.34 kg xylose per hour per m² membrane area.

Example 5A

A Process with a Combination of Chromatographic Separation and Nanofiltration, Including Recycling the Nanofiltration Concentrate Back to the Chromatographic Separation The process equipment and raw material as explained in Example 4 were used, but the nanofiltration concentrate was recycled back to the chromatographic separation. The separation feed was now diluted to approximately 53 g/1009 with the nanofiltration concentrate and separation recycle fraction. The feed liquor was filtered and the feed dry substance was finally adjusted to 48 g/100 g with the separation recycle fraction and the evaporation condensate.

The feed and the eluent were used at a temperature of 70° C. and the condensate obtained from the evaporation was used as the eluent. The feed rate to the separation was 66.6 kg dry substance in hour per one m³ of the separation resin.

After equilibration of the process, the following samples were collected: a residual fraction from each column, recycle fractions from columns 3 and 5 and a xylose product fraction from column 5. The results including HPLC analyses for the feed, the combined residual fraction, combined recycle fraction and for the combined xylose fraction are set forth in the table below.

TABLE E5-I

|  | Feed | Residual | Recycle | Xylose |
|---|---|---|---|---|
| Volume, % bed volume | 12.5 | 19.8 | 3.5 | 7.3 |
| Dry solids, g/100 ml | 60.0 | 23.6 | 31.2 | 27.7 |
| Xylose, % on DS | 16.4 | 1.5 | 22.6 | 44.9 |
| Glucose, % on DS | 2.9 | 0.6 | 5.9 | 5.9 |

TABLE E5-I-continued

|  | Feed | Residual | Recycle | Xylose |
|---|---|---|---|---|
| Other sugars, % on DS | 4.0 | 0.4 | 6.5 | 10.0 |
| Xylonic acid | 6.5 | 2.4 | 9.0 | 13.7 |
| Others, % on DS | 70.2 | 95.1 | 56.0 | 25.5 |

The xylose fraction (pH ~3.0) obtained from the chromatographic separation was subjected to nanofiltration. The nanofiltration was operated with a xylose yield of 85% and the dry substance of the concentrate was adjusted to 26 g/100 g with the condensate. In the equilibrium conditions, final concentrate and permeate samples from each three stages were collected. The results including HPLC analyses for the concentrate fraction, for the permeate fractions and for the combined permeate fraction are set forth in the table below.

TABLE E5-II

|  | Concentrate Final | Permeate stage1 | Permeate stage2 | Permeate stage3 | Permeate combined |
|---|---|---|---|---|---|
| Flux, kg/h/m² | 0.41 | 0.90 | 0.50 | 0.24 | 0.85 |
| Dry solids, g/100 g | 26 | 15.7 | 14.0 | 11.9 | 15.0 |
| Xylose, % on DS | 19.8 | 56.2 | 50.8 | 45.0 | 54.2 |
| Glucose, % on DS | 4.5 | 6.1 | 6.4 | 7.1 | 6.2 |
| Other sugars, % on DS | 6.1 | 10.9 | 12.0 | 12.5 | 11.3 |
| Xylonic acid | 11.1 | 13.8 | 14.7 | 14.4 | 14.0 |
| Others, % on DS | 58.5 | 13.0 | 16.1 | 21.0 | 14.3 |

The separation yield (from the chromatographic separation) calculated from the product fractions is 93% for xylose.

The nanofiltration yield calculated from the product fractions is 85% for xylose.

The combined yield including chromatographic separation and nanofiltration is 92% for xylose, when the nanofiltration concentrate was circulated back to the chromatographic separation.

The nanofiltration flux calculated from the product fractions is 0.46 kg xylose per hour per m² membrane area.

Example 5B

Crystallization of the Permeate from Nanofiltration Stage 1 of Example 5A

The nanofiltration permeate obtained from stage 1 above was evaporated and subjected to boiling and cooling crystallization. The feed solution for the crystallization contained 60.1% xylose on dry solids after evaporation. The solution was evaporated in a 400-liter evaporating crystallizer at a pressure of about 100 mbar, maintaining a temperature of 66° C. and a solution volume of 120 liters, and simultaneously introducing more solution to the crystallizer.

When a concentration of 83.9% was achieved at 66° C., 30 g of powdery dry xylose was added (average grain size 15

μm). Immediately after seeding, a crystallization-by-evaporation step of about 5 hours was started, simultaneously supplying more solution to the crystallizer, whereby the volume, the yield and the crystal size of the crystallization mass were increased. During the crystallization step, the dry solids content of the crystallization mass varied between 84 and 89.5%, and the temperature varied between 66 and 69° C. At the end of the crystallization step, when the batch volume had been achieved, the dry solids content of the mass was 89.6%. The crystallization mass was transferred to a cooling crystallizer, where it was cooled to 45° C. in 28 hours, and the crystals were separated from the mother liquor with a batch centrifuge. The centrifugation time was 5 min, and 10% of washing water on the weight of the crystallization mass was used. The mass was easy to centrifuge. The xylose purity of the crystals was 99.2%, and the yield was 55% on xylose. The run-off had a xylose content of 40.4% xylose on DS.

Example 5C

Precipitation Crystallization of the Permeate from Nanofiltration Stage 3 of Example 5A About 8 kg DS of the nanofiltration permeate from stage 3 (Table E5-II), obtained in Example 5A and having a xylose content of 45% on DS, was evaporated with a rotavapor (Buchi Rotavapor R-153) to DS of 93%. The temperature of the rotavapor bath was about 75° C. during the evaporation. The evaporated mass was put into a 6-liter cooling crystallizer. The jacket temperature of the crystallizer was 65° C. The mass was seeded with 3 g of powdered, crystalline xylose. A linear cooling program was started: from 65° C. to 25° C. in 40 hours. At the final temperature (25° C.) the mass viscosity was 331 000 cP. The mass was diluted with water (4.8 vol-%) to make the separation of the crystals easier. After homogenizing the mass for about 2 hours, the mass viscosity was 32 000 cP. The xylose crystals were separated with a pressure filter (Larox PF 0.1H2 with filter textile Tamfelt 2209 L1). The filtration area was 0.1 m². A part of the crystallisation mass was introduced onto the filter textile and then pressed at 16 bar for 40 min. After that the air drying cycle was put on for 2 minutes, at a pressure of 5 bar. Finally the crystal cake (having a thickness of about 2 cm) was removed from the filter textile and a representative sample for the analysis was taken. Also the mother liquor collected during the pressure filtration was analysed.

The table below gives the analysis results of the crystallization samples at the end of cooling, after dilution for the separation of the crystals and of the crystal cake. The yields calculated are 29% on DS/DS and 62% on xylose from xylose.

|  | Mass at the end of cooling | Larox cake |
|---|---|---|
| Dry solids, g/100 ml | 92.8 | 95.9 |
| Xylose, % on DS | 47.3 | 76 |
| Glucose, % on DS | 7.5 | 4 |
| Other sugars, % on DS | 13.1 | 4.9 |
| Xylonic acid | 15.1 |  |
| Others, % on DS | 17 |  |

Example 5D

A Process with a Combination of Chromatographic Separation and Nanofiltration, Including Recycling the Nanofiltration Concentrate (Retentate) Back to the Chromatographic Separation The test equipment included a simulated moving bed chromatographic separation unit and a continuous nanofiltration unit.

The chromatographic separation unit included five columns connected in series, a feed pump, a heat exchanger, recycling pumps, an eluent water pump, flow controls for liquid flows as well as inlet and product valves for the various process streams. The total length of the resin bed was 20 m and the column diameter was 0.2 m. Columns were packed with a strong acid gel type cation exchange resin (Finex CS 13 GC) in $Mg^{2+}$-form. The mean bead size was 0.38 mm and the divinylbenzene content was 6.5%.

The nanofiltration unit included three stages in series, a feed pump, recycling pumps, a diafiltration water pump, flow and density controls for liquid flows as well as inlet and product valves for the various process streams. Each stage had two nanofiltration membranes and the total membrane area was 36.6 m². Osmonics Desal 5 DL spiral wound membranes were used and the conditions in the nanofiltration were set to an inlet pressure of 29.5 bar and a temperature of 65° C. The pressure drop over the each membrane element was 0.3 bar.

As raw material, a xylose-containing spent liquor from $Mg^{2+}$ based cooking (MgSSL) was used and the aim was to separate the xylose contained therein. The properties of the spent liquor are set forth in the table below, whereby the percentages are given on a dry substance weight basis.

TABLE E5-III

| Composition of MgSSL | |
|---|---|
| Dry substance, g/100 g | 64.5 |
| pH (as is) | 2.8 |
| Xylose, % on DS | 16.0 |
| Glucose, % on DS | 2.2 |
| Other sugars % on DS | 3.6 |
| Xylonic acid | 5.3 |
| Others, % on DS | 72.9 |

The separation feed was diluted to approximately 56.5 g/100 g with the nanofiltration concentrate. The feed liquor was filtered with a Seitz pressure filter using Arbocell B800 as a filtering aid (precoat 1 kg/m², bodyfeed 0.5% on DS) and the feed dry substance was finally adjusted to the 49.0 g/100 g (=59.2 g/100 ml) with a separation recycle fraction. The feed and the eluent were used at a temperature of 70° C. and 2.0 weight-% acetic acid solution was used as the eluent. The separation feed interval was 77 minutes.

After equilibration of the process, the following samples were collected: residual fraction from each column, recycle fractions from columns 3 and 5 and xylose product fraction from column 5. The results including HPLC analyses for the combined residual fraction, combined recycle fraction and for the combined xylose fraction are set forth in the table below.

TABLE E5-IV

|  | Feed | Residual | Recycle | Xylose |
|---|---|---|---|---|
| Volume, l | 73.5 | 128.0 | 21.1 | 42.4 |
| Dry solids, g/100 ml | 59.2 | 20.0 | 27.6 | 31.9 |
| Xylose, % on DS | 18.2 | 1.1 | 24.3 | 46.9 |
| Glucose, % on DS | 3.0 | 0.9 | 6.8 | 5.4 |
| Other sugars % on DS | 5.0 | 0.7 | 7.7 | 11.7 |
| Xylonic acid | 6.4 | 3.7 | 5.4 | 10.1 |
| Others, % on DS | 67.4 | 93.6 | 55.8 | 25.9 |

The xylose fraction (pH 3.3) obtained from the chromatographic separation was subjected to nanofiltration. Nanofiltration was operated with a 85% xylose yield in the diafiltration mode and the concentrate dry substance was set to 25.0 g/100 g. 2.0 weight-% acetic acid solution was used for diafiltration. After balancing the system, the final concentrate and permeate samples from each three stages were collected. The results including HPLC analyses for the concentrate fraction, for the permeate fractions and for the combined permeate fraction are set forth in the table below.

TABLE E5-V

|  | Concentrate final | Permeate stage1 | Permeate stage2 | Permeate stage3 | Permeate combined |
|---|---|---|---|---|---|
| Flux, kgds/h/m² | 0.29 | 1.02 | 0.98 | 0.40 | 0.78 |
| Dry solids, g/100 g | 25.0 | 17.9 | 16.1 | 16.0 | 16.3 |
| Xylose, % on DS | 26.0 | 58.7 | 51.4 | 51.9 | 53.3 |
| Glucose, % on DS | 4.6 | 4.7 | 5.8 | 5.7 | 5.5 |
| Other sugars % on DS | 9.2 | 10.4 | 12.3 | 12.1 | 11.5 |
| Xylonic acid | 13.1 | 9.6 | 10.3 | 10.0 | 9.6 |
| Others, % on DS | 47.1 | 16.7 | 20.3 | 20.3 | 20.1 |
| Xylose yield, % | 15.3 | 38.7 | 32.5 | 13.5 |  |

The yield of the chromatographic separation calculated from the product fractions was 95.7% for xylose with a purity of 46.9% on DS in the xylose fraction. The nanofiltration yield calculated from the product fractions was 84.7% for xylose with a combined permeate purity of 53.3% on DS. The combined yield of the chromatographic separation and the nanofiltration including recycling the nanofiltration concentrate back to the chromatographic separation feed was 95.0% for xylose. The nanofiltration flux calculated from the product fractions was 0.41 kg xylose per hour per m² membrane area. The combined permeate was evaporated to 53 weight-%. The xylose purity after the evaporation was 56.6% on DS.

In a reference test, the nanofiltration concentrate was not recycled back to the chromatographic separation. The results were as follows: the separation yield was 96.5% for xylose with a purity of 48.8% on DS in the xylose fraction. The nanofiltration yield was 92.5% for xylose with a combined permeate purity of 52.4% on DS. The combined yield including chromatographic separation and nanofiltration was 89.3% for xylose. The nanofiltration flux calculated from the product fractions was 0.38 kg xylose per hour per m² membrane area.

The permeate from stage 1 when evaporated to 54 weight-% contained 62.2% on OS xylose. The evaporated permeate was subjected to the boiling and cooling crystallization as described in Example 5B above.

Permeates from stage 2 and 3 where combined and concentrated by evaporation to a dry solids content of 55%, having a xylose content of 54.7% on DS. The solution was further concentrated and subjected to precipitation crystallization as described in Example 5 C above.

Example 5E

Nanofiltration Process Including Recycling the Last Nanofiltration Permeates Back to the Nanofiltration Feed The process equipment and raw material as explained in Example 5D were used, but the nanofiltration permeate from the third stage was recycled back to the feed of the first nanofiltration stage to be used as diafiltration water. The nanofiltration feed (the xylose fraction from the chromatographic separation) was diluted to approximately 24 g/100 g with the nanofiltration permeate from the third stage. In the equilibrium conditions, the final concentrate and permeate samples from each three stages were collected. The results including HPLC analyses for the concentrate fraction, for the permeate fractions and for the combined permeate fraction (from stages 1 and 2) are set forth in the table below.

TABLE EV-V1

|  | NF Feed | Feed with 3rd stage permeate | Permeate stage1 | Permeate stage2 | Permeate stage3 | Permeate to crystallisation (stages 1 and 2) | Concentrate Final |
|---|---|---|---|---|---|---|---|
| Flux, kg/h/m² |  |  | 6.0 | 6.4 | 4.0 |  |  |
| Dry solids, g/100 g | 25.7 | 24.0 | 14.7 | 15.6 | 15.8 | 15.1 | 26.6 |
| Xylose, % on DS | 46.4 | 47.3 | 56.6 | 55.1 | 53.0 | 55.9 | 27.5 |
| Glucose, % on DS | 5.0 | 4.2 | 2.9 | 4.2 | 5.3 | 3.6 | 4.3 |
| Other sugars, % on DS | 5.0 | 5.2 | 3.7 | 5.3 | 6.5 | 4.5 | 5.4 |
| Others, % on DS | 44.6 | 43.4 | 36.7 | 35.3 | 35.2 | 36.0 | 62.9 |

The nanofiltration yield calculated from the product fractions, permeates from stages 1 and 2, was 86% for xylose. The nanofiltration flux calculated from the product fractions was 0.34 kg xylose per hour per m² total membrane area.

Example 6

Nanofiltration and Crystallization of Fructose 930 kg of fructose liquid from fructose crystallization run-off was diluted to 49% DS and fed to the feed tank of the nanofiltration equipment (GEA nanofiltration pilot model R equipment). Nanofiltration was started as a batch operation by using two Osmonics Desal 5 DL spiral wound modules at a feed pressure of 40 bar and at temperature of 60° C. The concentration was kept at 49% DS by adding non-ionized water to the reactor. Totally 660 kg water was added during the diafiltration phase. Water feed was continued to keep the constant DS until there was 180 kg of concentrate on the retentate side. At that point water feed was ceased and nanofiltration was continued until there was 50 kg of concentrate left. During the nanofiltration run, the permeate was divided timewise to three fractions. The first permeate fraction was stored from the beginning until 700 kg permeate was collected. The second permeate was stored until the next 700 kg permeate fraction was collected. The last 140 kg of permeate was stored as the third permeate fraction and recycled back to the nanofiltration feed. A total yield of 99.2% fructose to the permeates was achieved.

|  | Fructose, % on DS |
|---|---|
| Feed solution | 89.7 |
| 1st permeate | 92.8 |
| 2nd permeate | 93.1 |
| 3rd permeate | 89.4 |
| Concentrate | 51.5 |

The nanofiltration retentate can be subjected to chromatographic separation to enrich fructose.

The first permeate and second permeate were further tested in fructose crystallization.

| Syrup | $RDS_{fructose}$ g/100 g | PH (RDS 50%) | Colour | Disaccharides 2 % on RDS | Glucose % on RDS | Fructose % on RDS |
|---|---|---|---|---|---|---|
| 1st permeate | 62.6 | 4.4 | 220 | 0.8 | 3.7 | 92.8 |
| 2nd permeate | 46.4 | 4.4 | 80 | 0.3 | 3.7 | 93.1 |
| 3rd permeate (recycled) | 47.6 | 4.2 | 290 | 4.1 | 3.6 | 89.4 |

The first nanofiltration permeate obtained above was subjected to cooling crystallization to crystallize the fructose contained therein. About 25 liters of the permeate liquid (RDS 46.6%) was evaporated with a rotavapor (Buchi Rotavapor R-153) to RDS of 92.4%. The temperature of the rotavapor bath was about 65° C. during the evaporation. 8.9 kg of the evaporated mass (8.2 kg DS) was put into a 6-liter cooling crystallizer. The jacket temperature of the crystallizer was 58° C. and the mass temperature 56.5° C. The mass was seeded with 0.4 g of powdered, crystalline fructose. A linear cooling program was started: from 57° C. to 52° C. in 16 hours. Thereafter the cooling program was continued from 52° C. to 32° C. in 12 hours. At the final temperature (30° C.) the mass was too thick for centrifugation, and therefore it was warmed to 40° C. Fructose crystals were separated by centrifugation (with Hettich Roto Silenta II centrifuge; basket diameter 23 cm; screen openings 0.15 mm) at 3500 rpm for 3 minutes. The crystal cake was washed by spraying with 7% washing water.

Good yields were obtained by centrifugation: 51% (DS/DS) and 54% fructose from fructose. The fructose purity of the crystal cake was 99.1% on RDS and dry solids 98.4% of weight.

The second fructose permeate behaved in the crystallization in the same way as the first permeate above.

The third fructose permeate is recycled to the feed to dilute the dry substance of the feed and to replace part of the dialysis water.

Example 7

Nanofiltration of Maltose

Two nanofiltration feed solutions were prepared from a maltose-glucose syrup. The dry substance content of the feed liquid was adjusted to about 30 weight-% and the total amount to 10 kg.

The feed liquids were subjected to nanofiltration with DDS LabStak M20 laboratory membrane unit equipped with a MPF-36 membrane. During the nanofiltration experiment, the volume of the feed solution was maintained constant by adding water equivalent to the permeated liquid. The experiment was done at an inlet pressure of 33 bar. The temperature of the feed was controlled during the test to be at 35° C.

The nanofiltration permeate was collected as three different fractions. The permeate fractions were taken successively after filtration times of 130 min, 285 min and 330 min. The sugar composition of the permeate samples was analysed by HPLC.

The results of the test are shown in the table below ("Perm 1", "Perm 2" and "Perm 3" refer to permeates from nanofiltration stages 1, 2 and 3, and "Ret 1", "Ret 2" and "Ret 3" refer to retentates from nanofiltration stages 1, 2 and 3).

|  | Feed | Perm 1 | Ret 1 | Perm 2 | Ret 2 | Perm 3 | Ret 3 |
|---|---|---|---|---|---|---|---|
| Filtration time, min |  | 130 |  | 285 |  | 330 |  |
| Flux, kg/h/m$^2$ |  | 31 |  | 50.2 |  | 60.9 |  |
| DS (g/100 g) | 31.67 | 25.87 | 19.35 | 12.72 | 12.95 | 6.95 | 23.05 |
| Saccharides, % on DS |  |  |  |  |  |  |  |
| Oligosaccharides | 1.6 | 0.6 | 2.5 | 0.8 | 3.5 | 0.9 | 4.2 |
| Maltotriose | 0.01 | 0.00 | 0.03 | 0.01 | 0.04 | 0.02 | 0.05 |
| Maltose | 44.8 | 35.5 | 51.9 | 44.1 | 60.7 | 53.0 | 65.4 |
| Glucose | 47.7 | 53.3 | 38.8 | 49.5 | 31.9 | 44.2 | 26.9 |
| Fructose | 4.1 | 4.5 | 2.9 | 4.1 | 2.0 | 3.2 | 1.4 |

The dry solids yield to the permeate 2 was about 30% and to the permeate 3 about 60% from the feed. It can be seen from the results of the table above that the ratio of maltose to glucose and also the oligomer content vary with the time. A product with desired ratio of maltose to glucose can be collected either from the permeate or the retentate.

Example 8A

Nanofiltration of Inositol, Including Recycling the Nanofiltration Permeate Downstream for Use as Diafiltration Water A solution (488 kg) from chromatographic separation of beet molasses containing 82.9% on DS of inositol and having a dry solids content of 20% was subjected as a feed to nanofiltration. The nanofiltration was carried out by using GEA Pilot unit model R as a batch mode. The membrane used in the nanofiltration was GE Osmonics Duratherm Excel 3840 HF (Desal DL) with spiral elements having a membrane area of 6.1 m². The pH of the inositol solution used as the feed was adjusted to 8.8 with 10% formic acid. The inositol purity of the feed solutions to nanofiltration was 82.9% on DS. In the first stage the nanofiltration was carried with constant permeate mode, i.e. the permeate flow of the nanofiltration permeate was kept at a constant flow rate of 15 kg/h·m² by adjusting the inlet pressure to meet the permeate flow rate requirement. The temperature during the filtration was constant, 70° C.±2° C. The concentration of the retentate was continued until the retentate dry substance content of 28 g/100 g was reached. 221 kg of the retentate was retained having a purity of 80.3% on DS. The dry substance content of the first stage NF permeate was 13.6% and the inositol purity 87.5% on DS. During the nanofiltration, the pressure was gradually increased from the initial 22 bar to 27 bar.

In the second stage, the concentration nanofiltration was continued by a diafiltration step by using recovered permeate from the first stage nanofiltration as diafiltration water. The feed was the retentate from the first nanofiltration stage. When there was no permeate from the first step left, then ion-free water was used as diawater to reach the target yield level. The target of second stage (diafiltration nanofiltration) was to obtain the inositol to the NF permeate and keep the dry substance content of the retentate at a level of 28%. Nanofiltration was continued until a total inositol yield of about 95% (on the inositol of the feed) to permeate was achieved. The collected total permeate in the second stage had a dry solids content of 15 g/100 g and an inositol purity of 88.7% on OS. The total amount of permeate from second stage was 590 kg.

Example 8B

Nanofiltration of Xylose, Including Recycling the Nanofiltration Permeate Downstream for Use as Diafiltration Water 2000 l of Mg-sulphite spent liquor (the dry solids content 10 g/100 g, pH ~4.5) was evaporated to a concentration of 16 g/100 g and introduced as a feed to nanofiltration. The nanofiltration was carried out by using GEA Pilot unit model R as a batch mode. The membrane used in the nanofiltration was GE Osmonics Duratherm Excel 3840 HF (Desal DL) with spiral elements having a membrane area of 6.1 m². The xylose purity of the feed solution was 12.5% on DS. The temperature during the nanofiltration was constant, 60° C. Concentration by nanofiltration was continued until a dry substance content of the retentate of 41.2 g/100 g was reached. 557 kg of the retentate was retained having 10.3% xylose on DS. The dry substance content of the permeate in the first stage was approximately 1.1% and the xylose purity was 65% on DS. The amount of produced NF permeate was 950 kg.

In the second nanofiltration stage, the xylose of the retentate from first stage was allowed to permeate to the permeate side by continuing filtration of the nanofiltration retentate, using permeate from the first concentration stage as diafiltration water. When all the permeate from first stage was used as diafiltration water, then 75 kg ion-free water was used as additional diawater to reach the target xylose yield level. The target of the second stage (diafiltration nanofiltration) was to obtain the xylose to the NF permeate with high yield and keep the NF retentate dry substance at a constant value of 41%. Nanofiltration was continued until a 85% yield of xylose (based on xylose of the feed) to the permeate was achieved. The concentration of the collected total permeate was 2.7 g/100 g and the xylose purity was 62.0% on DS. The total amount of the permeate from diafiltration step was 1504 kg.

It will be obvious to a person skilled in the art that, as the technology advances, the inventive concept can be implemented in various ways. The invention and its embodiments are not limited to the examples described above but may vary within the scope of the claims.

The invention claimed is:

1. A process for separating and recovering at least one monosaccharide sugar from a solution containing said at least one monosaccharide sugar, comprising:
   (i) nanofiltering the solution to obtain a nanofiltration permeate and a nanofiltration retentate, whereby said at least one monosaccharide sugar is enriched in the nanofiltration permeate, and
   (ii) collecting the nanofiltration permeate in more than one fraction to obtain more than one permeate fraction where the relative difference between the contents of said at least one monosaccharide sugar in one collected nanofiltration permeate fraction, relative to the content of said at least one monosaccharide sugar in another collected permeate fraction, is more than 10%, on the dry solids (DS) basis, and
   (iii) recovering said at least one monosaccharide sugar from at least one of the collected nanofiltration permeate fractions by crystallization and subjecting at least one of the other collected nanofiltration permeate fractions to a precipitation crystallization, chromatographic fractionation or recycling to the nanofiltration.

2. A process as claimed in claim 1, wherein the solution containing said at least one monosaccharide sugar has a content in the range of 1 to 95% by weight on DS of one of the at least one component to be recovered.

3. A process as claimed in claim 1, wherein the process further comprises:
   (iv) recycling at least one of the collected nanofiltration permeate fractions to the nanofiltration feed.

4. A process as claimed in claim 3, wherein the at least one nanofiltration permeate fraction to be recycled has a content of said at least one monosaccharide sugar in the range of 5 to 85% by weight on DS.

5. A process as claimed in claim 1, wherein said chromatographic fractionation produces a fraction enriched in said at least one monosaccharide sugar.

6. A process as claimed in claim 5, wherein the fraction enriched in said at least one monosaccharide sugar is recycled to the nanofiltration.

7. A process as claimed in claim 6, wherein the fraction enriched in said at least one monosaccharide sugar has a content in the range of 5 to 90% by weight on DS of the at least one component.

8. A process as claimed in claim 1, wherein the nanofiltration permeate fraction(s) to be subjected to crystallization in step (iii) has/have a content in the range of 5 to 95% by weight on DS of said at least one monosaccharide sugar.

9. A process as claimed in claim 1, wherein said crystallization is selected from cooling crystallization, boiling crystallization and a combination of boiling and cooling crystallization.

10. A process as claimed in claim 1, wherein the nanofiltration permeate fraction(s) to be subjected to the precipitation crystallization in step (iii) has/have a content in the range of 5 to 80% on DS of said at least one monosaccharide sugar.

11. A process as claimed in claim 1, wherein the nanofiltration together with said chromatographic fractionation of step (iii) provides a yield of more than 25% by weight on DS of said at least one monosaccharide sugar.

12. A process as claimed in claim 1, wherein the nanofiltration retentate is collected in one fraction and recycled to the nanofiltration.

13. A process as claimed in claim 1, wherein one of the collected nanofiltration permeate fractions is recycled to the nanofiltration and another of the collected nanofiltration permeate fractions is subjected to chromatographic fractionation, and wherein the nanofiltration retentate is also collected in more than one fraction to produce more than one nanofiltration retentate fraction.

14. A process as claimed in claim 1, wherein the collected nanofiltration permeate fraction to be recycled is mixed with the nanofiltration feed.

15. A process as claimed in claim 1, wherein at least one of the collected nanofiltration permeate fractions is recycled to the nanofiltration for use as diafiltration water.

16. A process as claimed in claim 1, wherein the said at least one monosaccharide is selected from xylose, fructose, glucose, arabinose, mannose, galactose, and rhamnose.

17. A process as claimed in claim 1, wherein the solution comprises a hydrolysate of plant-based biomass.

18. A process as claimed in claim 17, wherein the hydrolysate of plant-based biomass is a hydrolysate of lignocellulosic material.

19. A process as claimed in claim 1, wherein the solution is a spent sulphite pulping liquor.

20. A process as claimed in claim 1, wherein the solution is a fructose solution obtained from starch by hydrolysis and isomerization.

21. A process as claimed in claim 1, wherein the solution is a fraction obtained from chromatographic fractionation, membrane filtration or crystallization of a mixture comprising monosaccharides.

22. A process as claimed in claim 1, wherein the nanofiltration is carried out as a batch process.

23. A process as claimed in claim 1, wherein the nanofiltration is carried out as a continuous process.

24. A process as claimed in claim 1, wherein the nanofiltration is carried out with a nanofiltration membrane having a cut-off size in the range of 150 to 1000 g/mol.

25. A process as claimed in claim 1, wherein the nanofiltration is carried out with a nanofiltration membrane selected from polymeric and inorganic membranes.

26. A process as claimed in claim 1, wherein the relative difference between the contents of said at least one monosaccharide in one collected nanofiltration permeate fraction of step (ii), relative to the contents of said at least one monosaccharide in a second collected permeate fraction of step (ii), is more than 20% by weight on DS.

27. A process as claimed in claim 1, wherein the relative difference between the contents of said at least one monosaccharide in one collected nanofiltration permeate fraction of step (ii), relative to the contents of said at least one monosaccharide in another collected permeate fraction of step (ii), is more than 30% by weight on DS.

28. A process as claimed in claim 1, wherein the absolute difference between the contents of said at least one monosaccharide (% by weight on DS) in one collected nanofiltration permeate fraction of step (ii), relative to the contents of said at least one monosaccharide in another collected permeate fraction of step (ii), is more than 5 percentage units.

29. A process as claimed in claim 1, wherein the absolute difference between the contents of said at least one monosaccharide (% by weight on DS) in one collected nanofiltration permeate fraction of step (ii), relative to the contents of said at least one monosaccharide in another collected permeate fraction of step (ii), is more than 10 percentage units.

30. A process as claimed in claim 6, wherein the fraction enriched in said at least one monosaccharide has a content of more than 30% by weight on DS of said at least one monosaccharide.

31. A process as claimed in claim 1, wherein one of the at least one nanofiltration permeate fraction(s) to be subjected to crystallization in step (iii) has a content in the range of 20 to 90% by weight on DS of said at least one monosaccharide.

32. A process as claimed in claim 1, wherein one of the at least one nanofiltration permeate fraction(s) to be subjected to crystallization in step (iii) has a content of more than 50% by weight on DS of said at least one monosaccharide.

33. A process as claimed in claim 1, wherein one of the at least one nanofiltration permeate fraction(s) to be subjected to the precipitation crystallization in step (iii) has a content of less than 70% by weight on DS of said at least one monosaccharide.

34. A process as claimed in claim 1, wherein one of the at least one nanofiltration permeate fraction(s) to be subjected to precipitation crystallization in step (iii) has a content of less than 50% by weight on DS of said at least one monosaccharide.

35. A process as claimed in claim 1 or 3, wherein the nanofiltration together with said chromatographic fractionation of step (iii) provides a yield of more than 50% by weight on DS of said at least one monosaccharide.

36. A process as claimed in claim 1 or 3, wherein the nanofiltration together with said chromatographic fractionation of step (iii) provides a yield of more than 90% by weight on DS of said at least one monosaccharide.

37. A process as claimed in claim 1 or 3, wherein the nanofiltration together with said chromatographic fractionation of step (iii) provides a yield of more than 95% of said at least one monosaccharide.

38. A process as claimed in claim 1, wherein the nanofiltration is carried out with a nanofiltration membrane having a cut-off size in the range of 150 to 500 g/mol.

39. A process as claimed in claim 3, wherein the at least one nanofiltration permeate fraction is recycled to the nanofiltration feed through chromatographic fractionation.

40. A process as claimed in claim 12, wherein the nanofiltration retentate is recycled to the nanofiltration through chromatographic fractionation.

41. A process as claimed in claim 14, wherein the nanofiltration permeate fraction to be recycled to the nanofiltration feed is recycled through chromatographic fractionation.

42. A process as claimed in claim 16, where said at least one monosaccharide sugar is xylose.

\* \* \* \* \*